(12) United States Patent
Russ

(10) Patent No.: US 7,826,711 B2
(45) Date of Patent: Nov. 2, 2010

(54) DIGITAL VIDEO DISC (DVD) PLAYER OR DIGITAL VIDEO RECORDER (DVR) PLAYBACK WITH MEMORY

(76) Inventor: Samuel H. Russ, 1450 Turtle Dove La., Lawrenceville, GA (US) 30043

( * ) Notice: Subject to any disclaimer, the term of this patent is extended or adjusted under 35 U.S.C. 154(b) by 1136 days.

(21) Appl. No.: 11/419,430

(22) Filed: May 19, 2006

(65) Prior Publication Data

US 2007/0269189 A1 Nov. 22, 2007

(51) Int. Cl.
*H04N 5/91* (2006.01)
(52) U.S. Cl. .............................. 386/68; 386/95; 386/125
(58) Field of Classification Search .................. 386/46, 386/83, 95, 125, 126
See application file for complete search history.

(56) References Cited

U.S. PATENT DOCUMENTS

| | | | | |
|---|---|---|---|---|
| 5,913,039 A | * | 6/1999 | Nakamura et al. | 709/231 |
| 6,393,201 B1 | * | 5/2002 | Sakuramoto et al. | 386/95 |
| 6,493,506 B1 | | 12/2002 | Schoner et al. | |
| 2002/0174430 A1 | * | 11/2002 | Ellis et al. | 725/46 |
| 2002/0188839 A1 | * | 12/2002 | Noehring et al. | 713/153 |
| 2004/0028378 A1 | * | 2/2004 | Shimizu et al. | 386/68 |
| 2004/0250294 A1 | * | 12/2004 | Kim | 725/135 |

FOREIGN PATENT DOCUMENTS

| | | |
|---|---|---|
| EP | 1 624 680 A2 | 2/2006 |
| JP | 2004-206784 * | 7/2004 |

* cited by examiner

*Primary Examiner*—Huy T Nguyen
(74) *Attorney, Agent, or Firm*—Merchant & Gould

(57) ABSTRACT

The present invention is directed towards providing a viewer an option of beginning a previously-viewed DVD or DVR from its last viewed position. A processor determines a unique identifier of the DVD or DVR and stores the unique identifier in a presentation table in either an internal hard drive or RAM. When a viewer stops the DVD or DVR, the processor records the address (e.g., a logical block address and byte offset) of the DVD or hard drive, respectively, in the presentation table. At the time the DVD or DVR is viewed again, the processor provides the option of beginning the presentation at the last viewed position.

24 Claims, 6 Drawing Sheets

Presentation Table

| Unique Identifier | Last Stopped Date and Time | Last Stopped Position | Last Stopped Default Settings | Title |
|---|---|---|---|---|
| 32-bit unique identifier | 9/28/2006 9:23 | LBA 15, Byte Offset 112 | English; Surround Sound | Caddyshack |

FIG. 6

DIGITAL VIDEO DISC (DVD) PLAYER OR DIGITAL VIDEO RECORDER (DVR) PLAYBACK WITH MEMORY

TECHNICAL FIELD

The present invention is generally related to a communications system and, more particularly, is related to a system and method for a DVD player or a DVR to playback a plurality of presentations with memory.

BACKGROUND OF THE INVENTION

Video cassette recorder (VCR) tapes have been predominantly replaced by digital video discs (DVDs). The DVDs have better video and audio quality, and they typically outlast a VCR tape. A VCR tape, however, does have an advantage over a DVD. Namely, when a VCR tape is stopped, removed, and the player turned off, the tape remains in the last stopped position, assuming the tape has not been rewound. When a viewer wishes to resume viewing the VCR tape, it is simply reinserted into the player and played from the last stopped position. DVDs as well as digital video recorders (DVRs) do not have that capability. Typically, when a DVD or DVR presentation is stopped and the player turned off and/or the DVD ejected, the DVD player or DVR cannot restart the presentation from the location that the viewer left off. When the same presentation is reinserted or restarted, the viewer is given a main menu in which to choose several selections. For example, the viewer can choose to play from the beginning or select a scene from a scene index. The viewer is not given the option, however, of starting the presentation from the last stopped position. The closest option is to select a listed scene; however, it is difficult at times to know in which scene the viewer stopped watching, and the viewer ends up having to guess at the scene. Alternatively, some DVD players provide an option for storing the last played location on a small number of DVDs; however, these players have three specific shortcomings. First, they are only able to store a relatively small number of starting positions. Second, they rely on the DVD's titling information to identify the DVD, which is unreliable in the case of user-recorded DVDs such as DVD-RW discs made at home. Third, the player does not save and restore playback options such as alternate language tracks. There is a need, therefore, for systems and methods to allow a viewer the option of starting a plurality of presentations regardless of the recording disc format from exactly where they left off.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6 is an illustration of a presentation table stored in a hard drive that allows a processor to access the last stopped position of a presentation in accordance with the present invention.

DETAILED DESCRIPTION OF THE PREFERRED EMBODIMENTS

The preferred embodiments of the invention now will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Furthermore, all "examples" given herein are intended to be non-limiting.

The present invention is directed towards the enablement of allowing a viewer the option of starting a presentation from the last stopped position. More specifically, the viewer is presented with a main menu subsequent to inserting a DVD or turning a DVD player on with the DVD still inserted. An option on the main menu is presented to the viewer to begin watching the presentation from its last stopped position. In accordance with the present invention, the DVD may be any formatted disc, such as commercial DVDs, DVD-RWs/DVD-Rs, CDs, Data CDs, and DATA DVDs. Additionally, the main menu and last stopped position of a presentation is suitable for use in a STT having video recordings stored in a hard drive. Advantageously, the present invention is not limited to storing a last stopped position of just one or even a few DVDs and/or video recordings; the limit of stored DVDs and/or video recordings is based on the size of the hard drive. When the capacity of the hard drive is full, options may then be provided to the viewer that allows the latest-viewed presentations to be erased or that allows the viewer to erase presentations by presenting the titles, for example, for the stored presentations.

Figure 1:
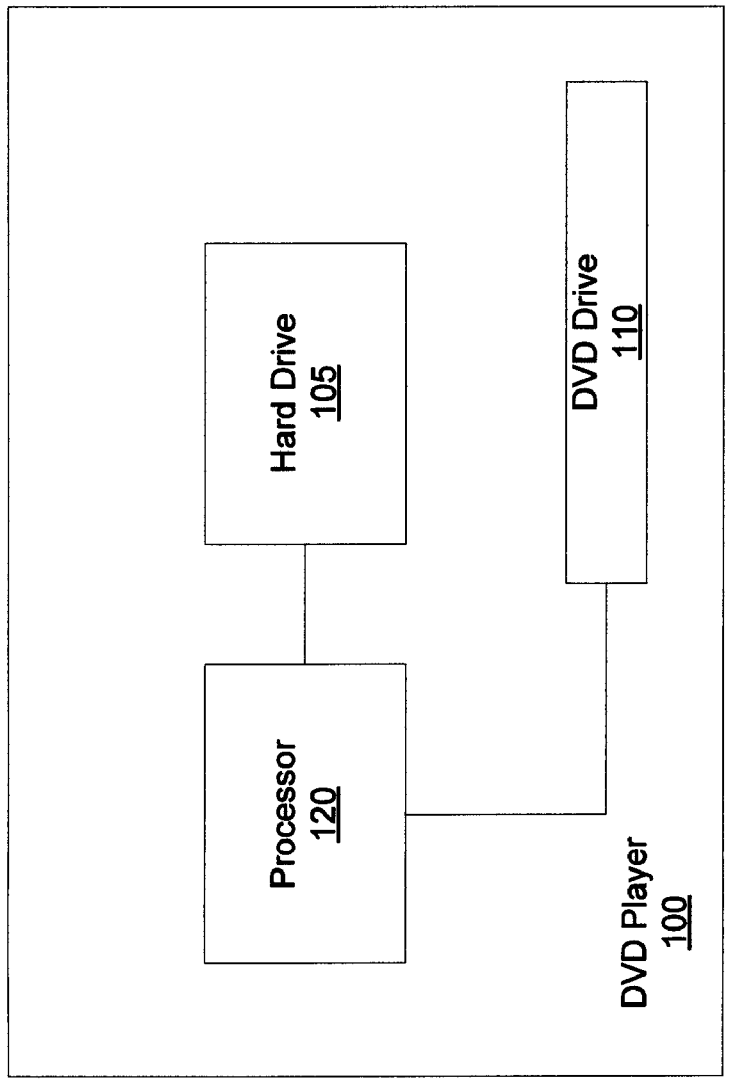
FIG. 1 is a block diagram of a DVD player with an internal hard drive in accordance with the present invention.

FIG. 1 is a block diagram of a DVD player 100 with an internal hard drive 105 in accordance with the present invention. When a DVD is inserted into the DVD device 110, a processor 120 determines a unique identifier and/or some other aspect of the presentation, e.g., a preprogrammed title, recorded on the DVD. The processor 120 determines the unique identifier by performing a hash function on the presentation to provide the unique identifier representing the DVD. Once an identifier is established, the processor 120 searches a presentation table, which includes a plurality of stored presentations, in the hard drive 105 to determine whether or not the presentation has previously been viewed and stored. If not, the unique identifier and/or other identified aspect of the presentation is then stored in the presentation table.

A non-limiting hashing function is for the processor 120 to read 4 bytes from logical block address (LBA) 17, byte offset 28; then read 4 bytes from LBA 1,115,764, bytes offset 64; next LBA 10,001,117, byte offset 112; finally, take the three 32-bit quantities and exclusive-or (XOR) them together. The result is a 32-bit unique identifier. There are other methods known in the art for performing a hash function, for example, a CRC function used in error detection. Advantageously, the probability of two different presentations having the same unique identifier resulting from a hash function is extremely unlikely.

A main menu is subsequently presented to the viewer. Assuming this is the first time the viewer is watching the presentation, the main menu may include standard viewing options. For example, options may include allowing the viewer to enter a title name that is then linked to the unique identifier, if a title is not included in the recording of the DVD, playing the presentation from the beginning, choosing a scene from a scene index, or skipping to the end of the presentation. Once selected, the presentation begins playing. When a user stops the presentation, the processor 120 notes the exact stopped location by noting its address. DVDs, like hard drives (HDDs), are addressed by a logical block address (LBA). More specifically, an LBA is a sector on the DVD and HDD that is sequentially numbered. By way of example, a DVD or HDD address may be read by commanding the processor 120 to read LBA number 1,234,560 having a byte offset. The stopped location is then stored in the presentation table on the hard drive 105. If a last stopped location already exists in the table, the latest stopped location replaces the earlier stopped location. Optionally, a last stopped time and date column may be included in the presentation table.

The viewer may come back at a later time to finish watching the presentation. The DVD player 100 may just restart the presentation already in the DVD drive 110, or the player 100 may be turned on and the DVD reinserted, if previously removed. The processor 120 determines the unique identifier of the presentation and subsequently determines that the presentation has previously been stored in the presentation table. Additionally, the processor 120 checks a last stopped location in the table. After establishing that the viewer had discontinued viewing the presentation before reaching the end, the processor 120 provides the viewer with main menu options in accordance with the present invention. The main menu may include all the standard options as well as an option that allows the viewer to begin watching the presentation from the last stopped position. If the viewer chooses to watch the presentation from the last stopped position, the processor 120 retrieves the stored LBA number and byte offset of the last stopped location and begins the presentation at that point. It will be appreciated that the viewer can stop and restart the presentation at its last stopped position as many times as desired.

The DVD player 100 may also be a multi-disc DVD player, which holds and plays numerous DVDs. The DVDs in the multi-disc DVD player are stored in the internal hard drive 105 in the same manner as a single-disc player. More specifically, a hash function is performed on all the discs when they are inserted into the player. A unique identifier for each disc is then stored in the hard drive 105. When one of the discs is played, stopped, and removed at some point in the presentation, the last stopped position is captured and stored in the hard drive 105 in conjunction with the unique identifier of that disc for later retrieval.

Figure 2:
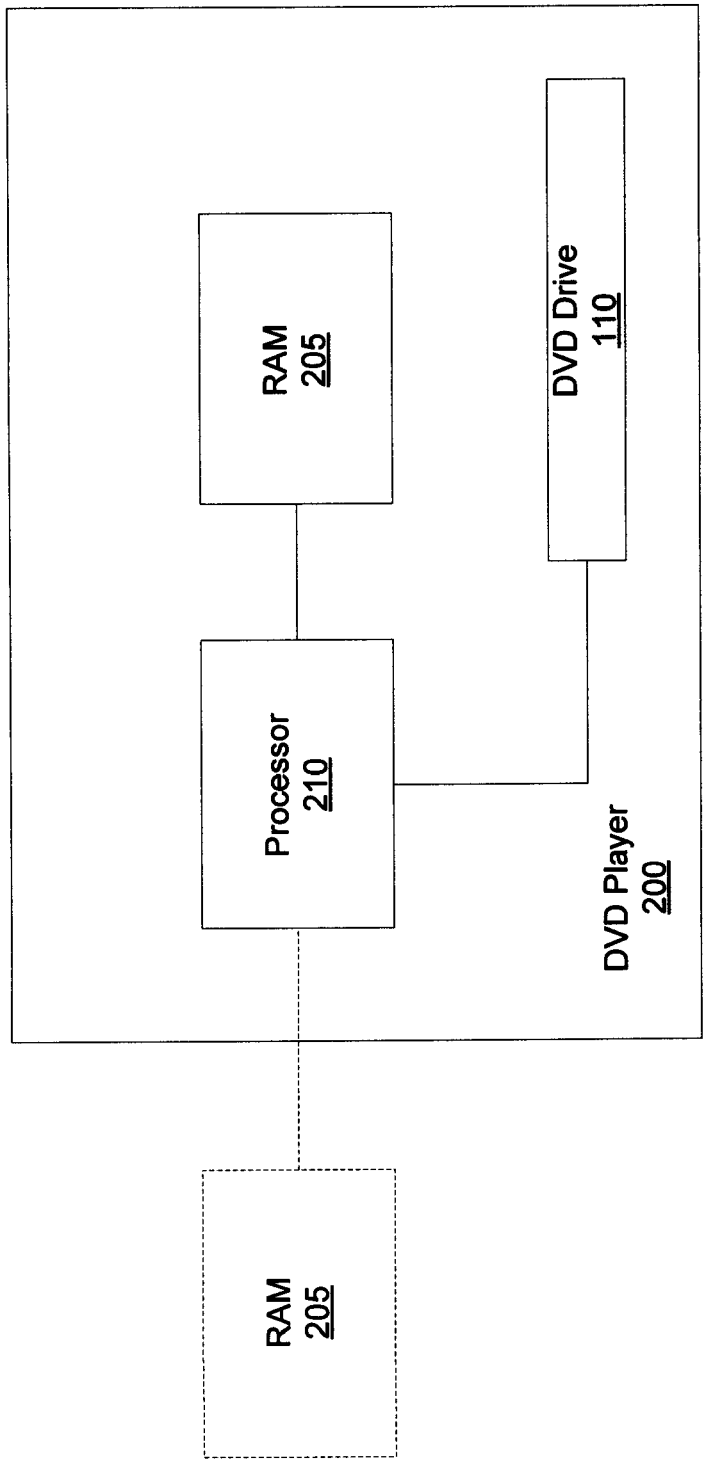
FIG. 2 is a block diagram of a DVD player with random access memory (RAM) in accordance with the present invention.

FIG. 2 is a block diagram of a DVD player 200 including RAM in accordance with the present invention. It will be appreciated that the RAM 205 may either be internal or external to the DVD player 200. It will also be appreciated that the RAM 205 can be battery-backed or non-volatile memory so that data is retained in the event of a power failure. Accordingly, the presentation table may be stored in RAM 205 and accessed by a processor 210. In this manner, a DVD player 200 that does not have an internal hard drive is capable of providing the viewer with a main menu allowing an option to continue viewing a previously viewed presentation from the last stopped location.

Figure 3:
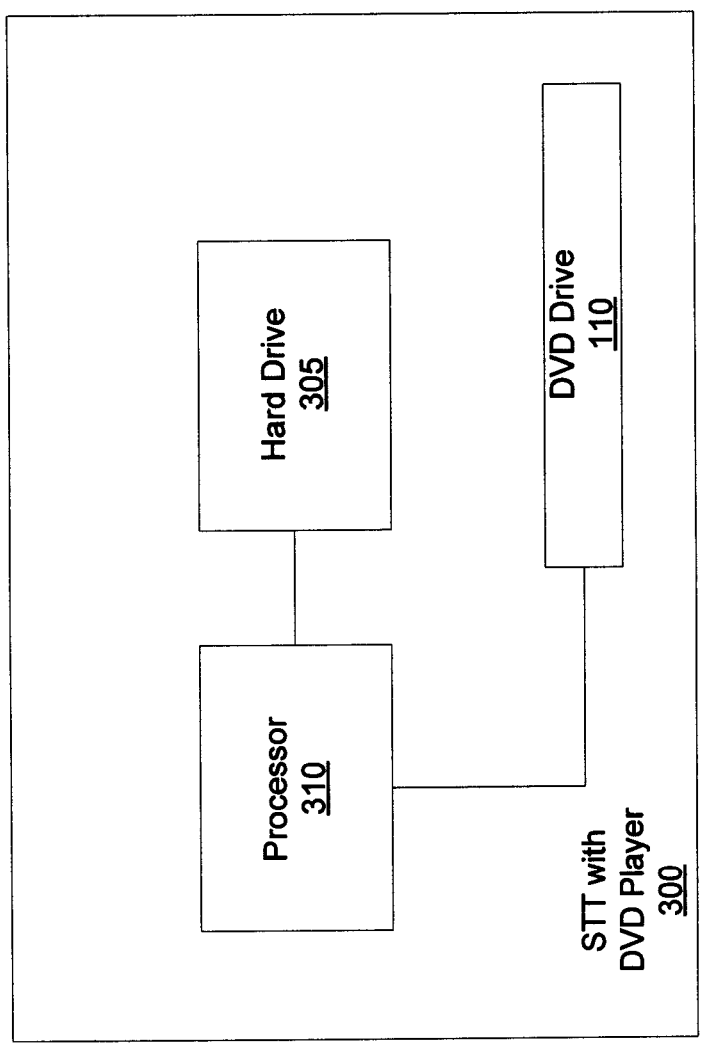
FIG. 3 is a block diagram of a set-top box (STT) with an internal DVD drive in accordance with the present invention.

FIG. 3 is a block diagram of a set-top box (STT) 300 with an internal DVD drive in accordance with the present invention. STTs 300 may now include an option to have an internal DVD drive 110. An STT 300 also typically includes a hard drive 305 that is capable of storing a presentation table, which can include a plurality of DVD presentations, in accordance with the present invention. When a DVD is inserted into the DVD drive 110, a processor 310 determines the unique identifier and/or some other identifier, e.g., the title, of the DVD. The presentation table stored in the hard drive 305 is then searched to determine if the presentation is already stored. If not, the identifier is subsequently stored in the presentation table. If determined that the presentation has been previously viewed, the processor 310 provides the viewer with a main menu giving an option to start viewing the presentation from the last stopped position.

Figure 4:
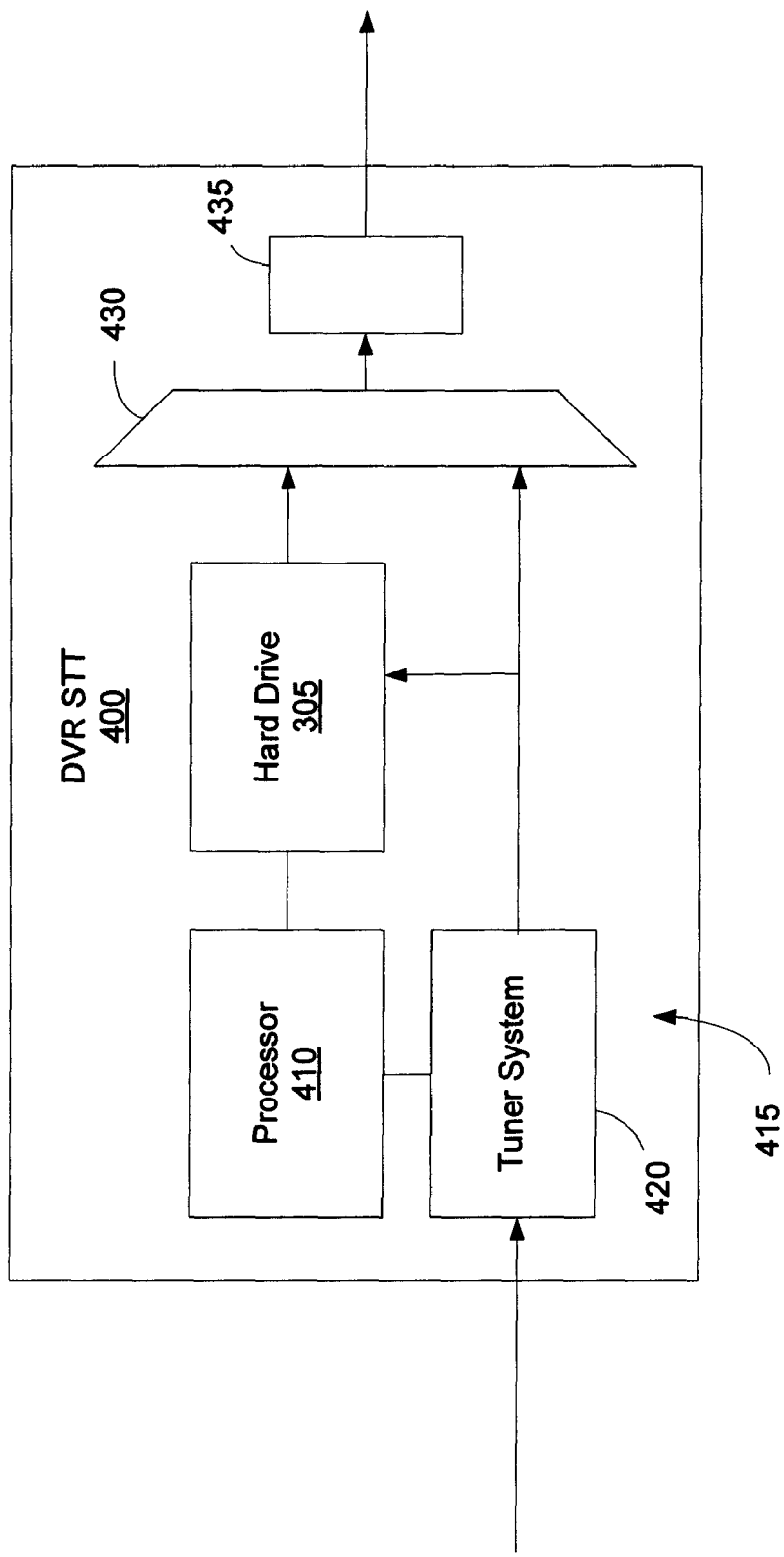
FIG. 4 is a block diagram of a DVR STT with an internal hard drive in accordance with the present invention.

FIG. 4 is a block diagram of a DVR STT 400 with an internal hard drive 305 in accordance with the present invention. The DVR STT 400 receives presentations via a tuner system 420 from a communications operator, and the viewer has the option of recording the presentation on the internal hard drive 305. When a DVR STT 400 records a program for the first time, it creates a table entry for that program. It will be appreciated that the recording presentation may not be viewed immediately. For example, the viewer may be viewing a channel on a first tuner of the system 420 while recording off a second tuner. A multiplexer 430 combines all potential paths so that there is one connection point to a decoder 435. When the recording is played, which may be later or may also be while the program is being recorded, e.g., in trick-play, a processor 410 notes when the viewer stops the program. By way of example, this can happen if the viewer tunes away, presses a STOP key, turns off the STT 400, presses a LIST key, and selects a different recording. As mentioned above, the last stopped position of the hard drive can be determined by the LBA number at the stopped location as well as using a byte offset, e.g., LBA Number 15, Byte 112. In one embodiment, the STT 300, 400 can divide the programming storage area in the hard drive into sector units called clusters. Therefore, another example of determining the last stopped position of the hard drive is by the address of the file system's allocation unit and a byte offset, e.g., Cluster 57 Byte 1124. In a preferred embodiment of the present invention, the DVR STT 400 makes use of a trick-link file to find the location of the next MPEG frame and logs that location as the starting point, i.e., the MPEG frame nearest the last stopped position, so that when the viewer begins viewing the program again, the playback resumes on a complete MPEG picture.

When the recorded program is restarted, the viewer is given the option of starting from the previously stored starting point or from the beginning of the program. In a preferred embodiment, this option is presented in the same user interface as is normally used for DVR playback. More specifically, the user interface is in the form of a DVR main menu that is selected within a program guide. It will be appreciated that the DVR STT 400 may also include a DVD drive. In this manner, the presentation table in the hard drive 305 may include both DVDs and DVRs and perform similar to a STT having a DVD drive (FIG. 3) in addition to the DVR STT 400.

Figure 5:
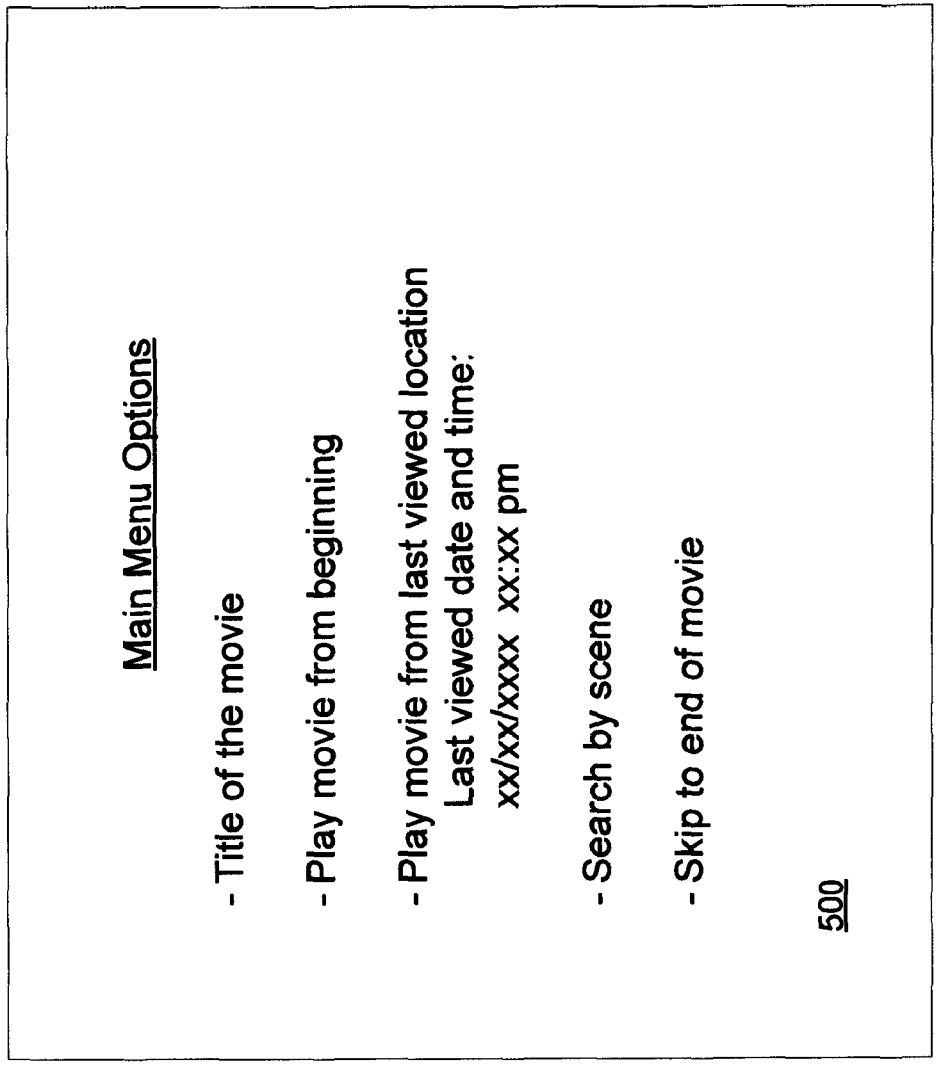
FIG. 5 is an illustration of a main menu presented to a viewer when a presentation is restarted that is suitable for use in a DVD player or a STT of FIGS. 1, 2, 3, and 4.

FIG. 5 is an illustration of a main menu 500 presented to a viewer when a presentation is started that is suitable for use in a DVD player or an STT of FIGS. 1, 2, 3, and 4. The main menu 500 includes the standard options, such as showing the title name of the movie, whether received from the movie itself or entered via the viewer, play movie from the beginning, search by scene, or skip to the end of the movie. In accordance with the present invention, the main menu 500 also includes the option to play the movie from the last stopped location. This option may be presented to the viewer only in the event that a unique identifier is found in the presentation table to avoid confusion to the viewer.

FIG. 6 is an illustration of a presentation table 600 stored in a hard drive that allows a processor to access the last stopped position of a presentation in accordance with the present invention. The presentation table 600 includes a unique identifier 605; an optional last stopped date and time 610; a last stopped position 615, and an optional title 625. The processors of FIGS. 1, 2, 3, and 4 identify the presentation that a viewer desires to begin viewing again by column 605 and subsequently provides the viewer with the main menu 500 of FIG. 5. Along with giving the viewer the option to begin the movie from the last stopped location, the main menu 500 may also display the last viewed date and time. Additionally, a viewer may select DVR or DVD playback settings 620, such as language selection and surround-sound settings, that may have been selected by the viewer on the first viewing. In this manner, the viewer has the option of selecting the previously stored settings without having to reset them again, if desired. In a first embodiment of the present invention, these settings are updated in the presentation table every time they are changed. In a further embodiment, the changes are ignored and the presentation or DVD is restarted with the default playback settings.

Accordingly, systems and methods have been described that enable a viewer an option to begin a previously-viewed presentation from its last stopped position. It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, the DVD players discussed hereinabove may be multi-disc players that allow for the insertion of multiple DVDs. All such modifications and variations are intended to be included herein within the scope of this disclosure and protected by the following claims.

The invention claimed is:

1. A method for starting a presentation recorded onto a DVD, the method comprising the steps of:
    determining a unique identifier of a started presentation;
    searching a presentation table to determine if the started presentation is stored in the presentation table, wherein if the unique identifier is found in the presentation table, determining if at least a portion of the started presentation has previously been viewed;
    determining that the started presentation is not in the presentation table;
    storing the unique identifier of the started presentation in a presentation identifier column of the presentation table;
    begin playing the started presentation;
    receiving notification that the played presentation is stopped;
    determining an exact location where the played presentation stopped;
    using a trick-link file to find the location of the next frame after the exact location; and
    storing the location of the next frame after the exact location in the presentation table in conjunction with the unique identifier of the played presentation.

2. The method of claim 1, further comprising the steps of:
    determining a date and time when the played presentation stopped; and
    storing the date and time in the presentation table in conjunction with the unique identifier of the played presentation.

3. The method of claim 1, further comprising the steps of:
    determining settings associated with viewing preferences associated with the played presentation; and
    storing the settings in the presentation table in conjunction with the unique identifier of the played presentation.

4. The method of claim 1, further comprising the steps of:
    receiving notification that the previously stopped presentation is requesting to be replayed;
    providing a menu option including an option to start playing the previously stopped presentation at the exact location stored in the presentation table;
    receiving notification to start playing the previously stopped presentation at the exact location stored in the presentation table; and
    begin playing the previously stopped presentation at the exact location where it was stopped.

5. The method of claim 3, further comprising the steps of:
    receiving notification that the previously stopped presentation is requesting to be replayed;
    providing a menu option including an option to start playing the previously stopped presentation at the exact location and an option to select settings associated with viewing preferences associated with the previously stopped presentation stored in the presentation table;
    receiving notification to start playing the previously stopped presentation at the exact location having the previously selected viewing preferences; and
    begin playing the previously stopped presentation at the exact location where it was stopped.

6. The method of claim 4, the steps further comprising:
    receiving notification that the previously stopped presentation is stopped;
    determining a second exact location where the previously stopped presentation stopped; and
    replacing the previous exact location in the presentation table with the second exact location.

7. The method of claim 1, wherein the determining the exact location step comprises determining a logical block address and byte offset on the DVD at the time the presentation was stopped.

8. The method of claim 1, wherein the determining the unique identifier of the presentation step comprises at least one of retrieving and decrypting an encrypted title recorded onto the DVD and performing a hash function on the presentation to determine the unique identifier representing the presentation.

9. The method of claim 1, wherein storing the unique identifier in the presentation table is stored in external memory.

10. The method of claim 1, wherein storing the unique identifier in the presentation table is stored in one of an internal hard drive or internal memory.

11. The method of claim 1, wherein the presentation table includes a plurality of unique identifiers along with a last stopped position from previously played DVDs.

12. The method of claim 1, wherein the unique identifier is determined by performing a hash function on the started presentation.

13. A method for starting a presentation recorded in a set-top box (STT), the method comprising the steps of:
   receiving a request to play a stored presentation;
   determining a unique identifier of the requested presentation;
   searching a presentation table for the unique identifier of the requested presentation to determine if the requested presentation has previously been viewed;
   determining that the requested presentation is not in the presentation table;
   storing the unique identifier of the requested presentation in the presentation table;
   begin playing the requested presentation;
   receiving notification that the requested presentation viewing is stopped by at least one of stopping the requested presentation or tuning away from the requested presentation;
   determining an exact location where the requested presentation stopped;
   using a trick-link file to find the location of the next frame after the exact location; and
   storing the location of the next frame after the exact location in the presentation table in conjunction with the unique identifier of the requested presentation.

14. The method of claim 13, wherein the determining the exact location step comprises determining one of a logical block address with a byte offset of a hard drive and a hard drive's file system allocation unit and a byte offset.

15. The method of claim 14, further comprising the steps of:
   receiving notification of a request to restart the stopped presentation;
   providing a menu option including an option to start playing the stopped presentation at the exact location stored in the presentation table;
   receiving notification to start playing the stopped presentation at the exact location stored in the presentation table; and
   restarting the previously stopped presentation at the exact location where it was previously stopped.

16. The method of claim 15, further comprising the steps of:
   receiving notification that the restarted presentation is stopped;
   determining a second exact location where the restarted presentation stopped; and
   replacing the previous exact location in the presentation table with the second exact location.

17. A digital video recorder (DVR) set-top box (STT) for recording and playing recorded presentations, the DVR STT comprising:
   a hard drive including a plurality of recorded presentations and a presentation table, wherein the presentation table comprises:
      a unique identifier for each of the plurality of recorded presentations; and
      a last stopped position for any of the plurality of recorded presentations that have been previously viewed and stopped prior to the end of the presentation, wherein the last stopped position is determined by using a trick-link file to find the location of the next frame after an exactly determined stopped location; and
   a processor for providing an option to begin a previously viewed presentation at the last stopped position.

18. The DVR STT of claim 17, wherein the last viewed position is an address of the hard drive at the last stopped position.

19. The DVR STT of claim 17, further comprising:
   a decoder for viewing a presentation from the hard drive, wherein, responsive to a request to tune a channel or view a different presentation, a last stopped position of the recording presentation is stored in the presentation table and the decoder views a different presentation.

20. The DVR STT of claim 19, wherein, when the recording presentation is desired to be restarted, the processor provides an option to begin viewing the recording presentation at the last stopped position.

21. The DVR STT of claim 20, wherein the recording presentation is restarted at the last stopped position and provided for viewing to the decoder.

22. The DVR STT of claim 17, further comprising a DVD drive for inserting a DVD, wherein a unique identifier of the DVD is stored in the presentation table, and wherein when the DVD is played and stopped before the end of the DVD, a last stopped position is stored in the presentation table in conjunction with the unique identifier of the DVD.

23. The DVR STT of claim 17, wherein the presentation table further includes last stopped settings, wherein the processor presents an option to begin a previously viewed presentation with the stored last stopped settings.

24. The DVR STT of claim 17, wherein the presentation table removes a stored presentation by one of deleting an oldest stored presentation or by receiving notification to remove one of the stored presentation by at least one of the unique identifier and a title.

* * * * *